United States Patent [19]

Churchill

[11] 4,041,242

[45] Aug. 9, 1977

[54] TELEPHONE SIGNALLING SYSTEM HAVING INTERRUPTION PREVENTIVE MEANS

[75] Inventor: Steven T. Churchill, Wilton, Conn.

[73] Assignee: Letot, Incorporated, Fairfield, Conn.

[21] Appl. No.: 665,107

[22] Filed: Mar. 8, 1976

[51] Int. Cl.² .......................................... H04M 11/04
[52] U.S. Cl. .................................... 179/2 A; 179/5 P
[58] Field of Search ............. 179/2 A, 2 R, 5 R, 5 P, 179/6 TA, 84 C; 340/286

[56] References Cited

U.S. PATENT DOCUMENTS

| | | | |
|---|---|---|---|
| 3,106,611 | 10/1963 | Hilker | 179/2 A |
| 3,304,376 | 2/1967 | Truby | 179/42 |
| 3,484,561 | 12/1969 | Matthews | 179/2 A |
| 3,564,148 | 2/1971 | Lee | 179/84 L |
| 3,636,280 | 1/1972 | Wetzel | 179/175.3 |
| 3,742,141 | 6/1973 | Duncan | 179/2 A |
| 3,777,065 | 12/1973 | Galian | 179/6 TA |
| 3,865,985 | 2/1975 | Stankus | 179/5 P |
| 3,892,922 | 7/1975 | Stankus | 179/2 A |

*Primary Examiner*—Kathleen H. Claffy
*Assistant Examiner*—Joseph A. Popek
*Attorney, Agent, or Firm*—Pennie & Edmonds

[57] ABSTRACT

A telephone signalling system having means for selectively disconnecting a telephone from a substation and connecting it to a message control unit including non-interrupt means responsive to current in the telephone wires when the telephone is in use for preventing disconnection of the telephone from the substation. Emergency override means are provided for disconnecting the telephone from the substation and connecting the telephone to the message control unit during an emergency irrespective of the telephone being in use.

The telephone signalling system in addition has means responsive to a test scanning signal to indicate proper connection of the telephone when it is connected to the message control unit.

4 Claims, 2 Drawing Figures

TELEPHONE SIGNALLING SYSTEM HAVING INTERRUPTION PREVENTIVE MEANS

DESCRIPTION OF THE PRIOR ART

Telephone signalling systems utilizing message control units for selectively imparting pre-recorded messages to a telephone are known. See for example the signalling system as disclosed in U.S. Pat. No. 3,865,985. As disclosed in that patent, a message control unit may include pre-recorded message means combined with ringing means to provide a number of pre-recorded messages, such as message waiting information, wakeup information or emergency fire evacuation information, all of which may be transmitted to a telephone in a hotel or motel room. While signalling systems as described in that patent are adaptable for use with any type telephone substations, they are not adaptable for use with some types of substations which do not incorporate sleeve lead type connections. The system of the aforementioned patent utilizes a non-interrupt means to prevent disconnection of the telephone from the substation when it is in use where the non-interrupt means is connected to the substation by a separate sleeve connection. It is therefore an object of my invention to provide for a telephone signalling system of the general type as shown in U.S. Pat. No. 3,865,985 which includes a non-interrupt means but does not require use of any separate sleeve connection extending to a substation.

It is a further object of my invention to provide for emergency override means by which the non-interrupt means may be overriden in the event of an emergency, such as a fire, when it becomes necessary to connect the telephone to a message control unit in order to obtain fire evacuation instructions.

A telephone signalling system of the type disclosed in the aforementioned patent further is inapplicable for use with some telephone substations through which a scanning current is transmitted to determine if telephones are properly connected to the substation. It is a further object of my invention to provide a circuit means for use with signalling systems having message control units which will feed back to the substation a signal that a telephone is not malfunctioning when it is disconnected from the substation and connected to the message control unit.

GENERAL DESCRIPTION OF THE INVENTION

Broadly a telephone signalling system constructed according to my invention comprises a telephone substation having at least one telephone connected to the substation by telephone wires. The telephone has a manually operated switch which in one position when the telephone receiver is off its cradle is adapted to connect the telephone for audio communication and which in a second position when the telephone receiver is on its cradle is adapted to connect the telephone to a calling signal means. A message control unit including ringing means and recorded audio message means is adapted to be connected to the telephone wires and telephone by selectively operative control means while at the same time the control means disconnects the telephone from the substation.

A non-interrupt means which is responsive to loop current in the telephone wires when the telephone is connected to the substation for audio communication is provided to prevent selective operation of the control means and consequent disconnection of the telephone from the substation when the telephone is being used. The non-interrupt means comprises a shunt circuit which bypasses a control circuit contained in the control means where the control circuit operates to disconnect the telephone from the substation and connect it to the message control unit. The shunt circuit contains a relay switch which closes in response to loop current in the telephone wires when the telephone is connected to the substation and is in an audio communication position so that current from a power supply is bypassed around the control circuit.

An emergency override means in the form of a switch is contained in the shunt circuit whereby the shunt circuit may be broken in the event that the relay switch reponsive to loop current is closed. This will insure breaking of the shunt circuit during an emergency enabling connection of the message control unit to the telephone irrespective of its being in audio communication with the substation.

DETAILED DESCRIPTION OF THE PREFERRED EMBODIMENT

Figure 1:
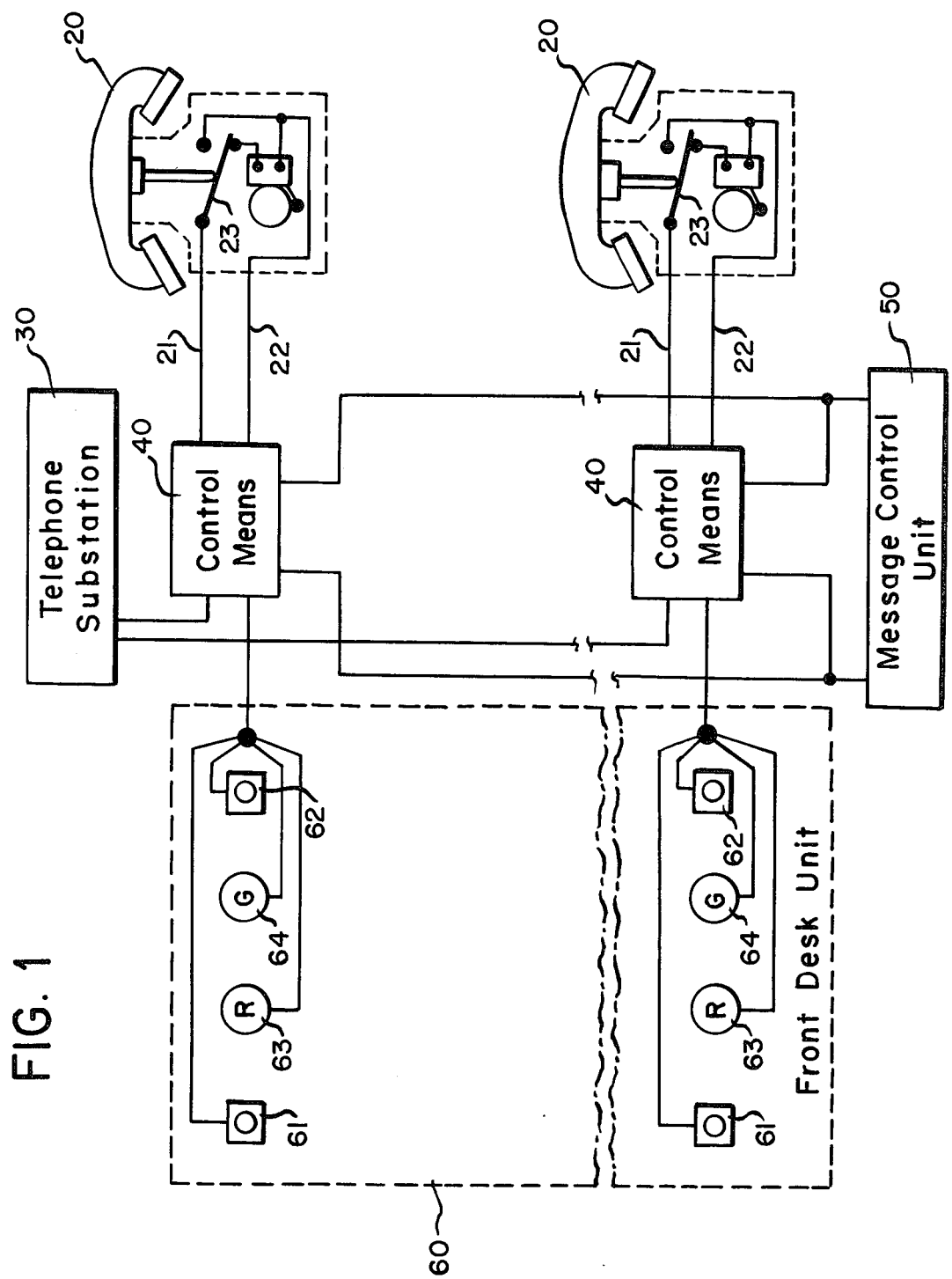
FIG. 1 is a diagrammatical circuit diagram illustrating a plurality of telepnones each connected with a control means, a substation and front desk unit; and, FIG. 2 is a diagrammatical illustration of the circuitry associated with a single telephone by which the telephone may be selectively disconnected from a telephone substation and connected to a message control unit and including means for preventing connection to the message control unit in the event that the telephone is being used.

Referring to FIG. 1, there is illustrated a telephone signalling system having a plurality of telephones 20 connected by way of telephone wires 21 and 22 to a telephone substation 30. A control means 40 is interposed between the substation and each of the telephones and comprises a means for connecting a message control unit 50 containing a ringing means and an audio communication means (both not shown) to each of the telephones. A front desk unit 60 contains indicating means and means for activating and deactivating the control means for each telephone wherein the indicating means indicates the status of the connection of the telephone to the message control unit and whether or not the message has been received by the telephone user.

Figure 2:
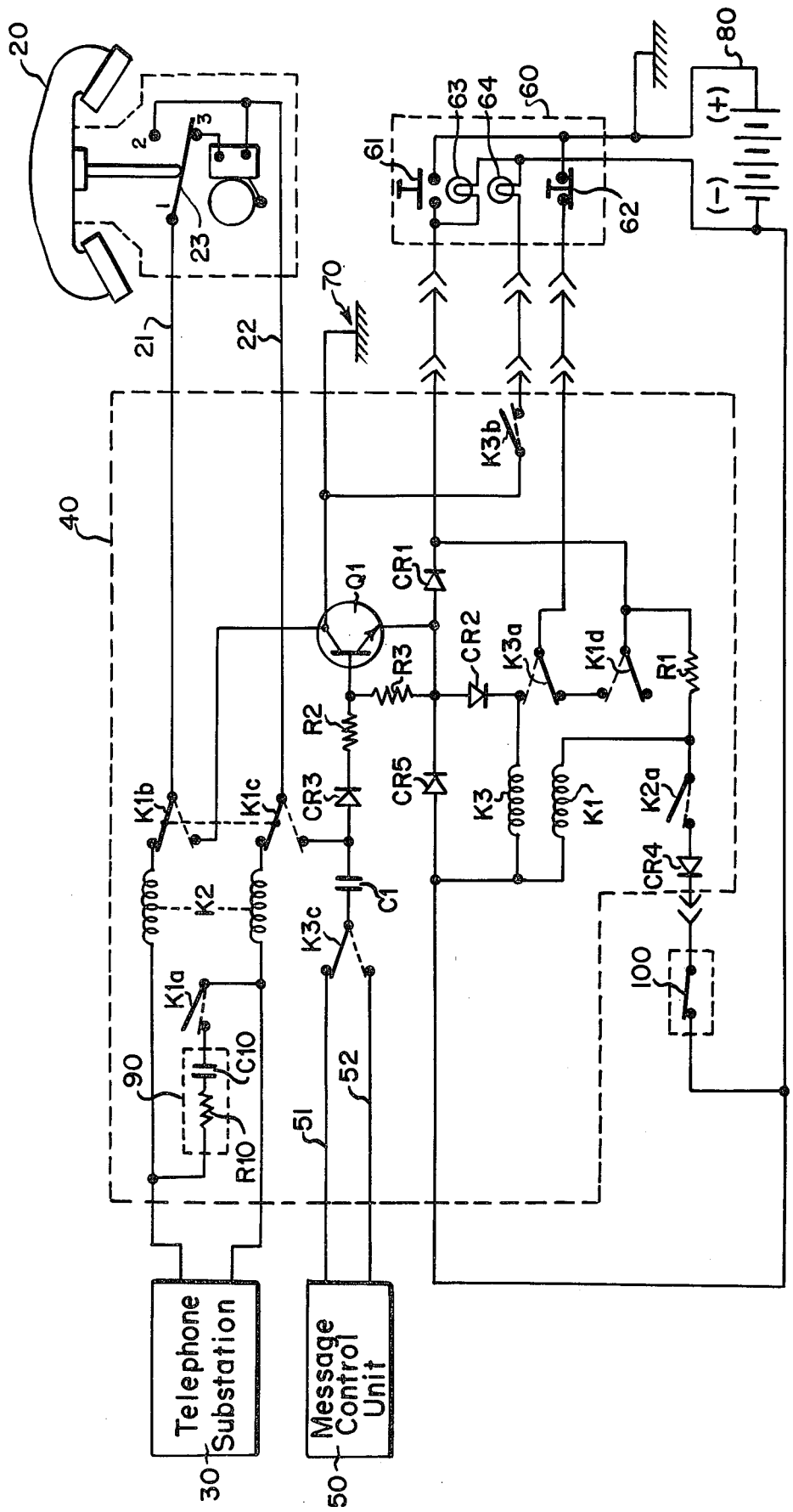

Referring to FIG. 2 it is seen that the front desk unit 60 for each telephone comprises a pushbutton type actuating switch 61 for activating the control means 40 and a pushbutton deactuating switch 62 for deactivating the control means. A red indicator lamp 63 indicates when a telephone is connected by the control means to the message control unit while a green indicator lamp 64 indicates when the message from the message control unit has been received by the telephone user and the telephone receiver returned to its cradle.

The control means 40 includes a resistance element R1 and a relay K1 which form part of a circuit when pushbutton 61 is depressed to momentarily connect the positive side of the power supply 80 through R1 and K1 to the negative side of the power supply. Relay K1 when energized in turn operates switches K1*b* and K1*c* to move the contacts from the position shown in full line to the dotted line position to disconnect the telephone wires 21 and 22 from the substation 30 and to connect the telephone wires 22 via switch K3c onto ring line 51 leading to a ringing unit contained with the message control unit 50. At the same time relay K1 is energized, switch K1d is moved from its full line position to its dotted line position whereby a holding or latching circuit for relay K1 is created through deactuating switch 62, switches K3a, K1d, resistance element R1 and relay K1 and back to the negative side of the power supply. At the same time a circuit is completed through switch 62, switches K3a, K1d and the red indicator lamp 63 to the negative side of the power supply where the indicator lamp 63 will indicate that the telephone has been disconnected from the telephone substation and connected to the ring line of the message control unit.

The telephone user upon the receipt of a ring signal transmitted by the message control unit will remove the handset from its cradle thus closing switch 23. This will complete a circuit from the ground 70 (positive) of the system through switch K1b, manually operated switch 23 in the telephone, switch K1c, diode CR3, resistance element R3, diode CR2, relay K3 and then on to the negative of the power supply 80. Current in this circuit will also provide a base voltage to drive the transistor Q1. Energization of K3 will move switch K3c from its full line position to its dotted line position to connect the audio line 52 leading from the message control unit to the telephone wire 22 whereby a pre-recorded message may be transmitted to the telephone. At the same time switch K3b is moved to its dotted line position to complete a circuit between positive ground and the negative side of the power supply through the green indicator lamp 64 which will indicate that the handset is off its cradle and that the user is receiving a message. Concurrently switch K3a will move to the dotted line position to create a latching circuit for the K3 relay. The K1 relay will remain energized through ground 70, the drive stage of the transistor Q1, and diode CR1. Since relay K1 remains energized the red indicator lamp also remains illuminated during this stage when the telephone handset is off its cradle.

When the handset is replaced on its cradle, switch 23 is opened thus breaking the circuit driving the transistor. This in turn will result in de-energization of relay K1 allowing switches K1b and K1c to move to their full line positions to reconnect the telephone wires 21 and 22 to the telephone substation. At the same time switch K1d moves to its full line position breaking the circuit containing the red indicator lamp and extinguishing it. The K3 relay however remains in its latched-up state so that the K3b switch remains closed to keep the green indicator lamp 64 illuminated thus indicating that the message from the message control unit has been received and acknowledged.

The system is cleared by depressing pushbutton 62, to break the latching circuit of the relay K3. At this time, switch K3b will open to break the circuit containing the green indicator lamp 64.

The control means 40 is provided with dual coils K2 which are energized by the loop current existing in the telephone wires 21 and 22 when the wires are connected to the telephone substation and the handset is off its cradle as during a normal conversation. Energization of coils K2 will close switch K2a contained in a shunt circuit comprising switch K2a, diode CR4 and an emergency switch 100. The shunt circuit when completed will bypass current from the positive side of the power supply when switch 61 is depressed from the relay K1 preventing movement of switches K1b and K1c to disconnect the telephone from the substation. This particular construction eliminates any need of a separate sleeve lead extending from the telephone substation to connect with an interrupt relay such as disclosed in U.S. Pat. No. 3,865,985.

The emergency switch 100 provides an override means by which the switch K2a may be overridden in the case of an emergency, such as the need to break in on an existing telephone conversation in the event of a fire or other emergency and where prompt evacuation instructions must be transmitted by the message control unit. If switch 100 is opened, the shunt circuit will be broken regardless of the position of switch K2a thus assuring energization of coil K1 upon actuation of pushbutton switch 61.

The control means is further provided with a malfunction inhibitor circuit 90 comprising a resistance element R10 and capacitor C10 connected in series with a switch K1a. When coil K1 is energized to disconnect the telephone wires 21 and 22 from the substation, switch K1a is moved to its dotted line position to make a circuit between the two wires leading to the telephone substation. Any test scanning current applied from the substation to determine if there is a malfunction in the connection of a particular telephone with the substation will give an indication that the telephone is in connection with the substation even though it is connected to the message control unit. This arrangement will prevent any false malfunction signal being imparted to indicate that the telephone is not properly functioning.

I claim:

1. A telephone signalling system comprising at least one telephone having a manually operated switch which in one position is adapted to connect the telephone for audio communication and in a second position to connect the telephone to a calling signal means, a telephone substation, telephone wires connecting said substation to said telephone, a message control unit adapted to be connected to said telephone wires and control means for selectively disconnecting said telephone wires from said substation and connecting said telephone wires to said message control unit; the improvement comprising having non-interrupt means separate and independent of said telephone substation responsive to loop current in said telephone wires when said telephone is connected for audio communication to prevent selective operation of said control means.

2. A telephone signalling system comprising at least one telephone having a manually operated switch which in one position is adapted to connect the telephone for audio communication and in a second position to connect the telephone to a calling signal means, a telephone substation, telephone wires connecting said substation to said telephone, a message control unit adapted to be connected to said telephone wires and control means for selectively disconnecting said telephone wires from said substation and connecting said telephone wires to said message control unit; the improvement comprising having a control circuit in said control means, a source of electrical energy, an actuator switch for selectively connecting said circuit to said source of electrical energy to engergize the same, switching means responsive to energization of said control circuit to disconnect said telephone wires from said substation and to connect them to said message control unit, and non-interrupt means responsive to loop current in said telephone wires when said telephone is connected for audio communication to prevent selective operation of said control means where said non-interrupt means comprises a shunt circuit positioned between said actuator switch and said control circuit, and a relay operated switch in said shunt responsive to said loop current to move to a closed position to complete said shunt circuit when said actuator switch is moved to connect said control circuit to said electrical source and a loop current exists whereby electrical energy will be shunted around said control circuit to prevent operation of said control means.

3. A telephone signalling system according to claim 2 having in addition emergency override means for disabling said interrupt means irrespective of any loop current.

4. A telephone signalling system according to claim 3 wherein said override means comprises an emergency switch in said shunt circuit which when opened breaks said shunt circuit.

* * * * *